United States Patent
Bains et al.

(10) Patent No.: US 8,392,796 B2
(45) Date of Patent: *Mar. 5, 2013

(54) RELIABILITY, AVAILABILITY, AND SERVICEABILITY SOLUTION FOR MEMORY TECHNOLOGY

(75) Inventors: Kuljit S. Bains, Olympia, WA (US); Joseph H. Salmon, Placerville, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/361,769

(22) Filed: Jan. 30, 2012

(65) Prior Publication Data

US 2012/0131414 A1 May 24, 2012

Related U.S. Application Data

(63) Continuation of application No. 11/942,621, filed on Nov. 19, 2007, now Pat. No. 8,132,074.

(51) Int. Cl.
*H03M 13/00* (2006.01)

(52) U.S. Cl. ....... 714/758; 714/755; 714/757; 714/6.24; 714/48; 714/746; 714/764; 714/767; 714/776; 714/799; 714/807; 714/808

(58) Field of Classification Search .................. None
See application file for complete search history.

(56) References Cited

U.S. PATENT DOCUMENTS

| | | | | |
|---|---|---|---|---|
| 6,519,733 | B1 * | 2/2003 | Har et al. | 714/758 |
| 7,380,197 | B1 * | 5/2008 | Goolsby | 714/758 |
| 7,587,643 | B1 * | 9/2009 | Chopra | 714/726 |
| 7,844,888 | B2 * | 11/2010 | Nygren et al. | 714/805 |
| 7,861,140 | B2 * | 12/2010 | Talbot | 714/766 |
| 2007/0011562 | A1 * | 1/2007 | Alexander et al. | 714/758 |
| 2007/0226588 | A1 * | 9/2007 | Lee et al. | 714/758 |
| 2008/0195914 | A1 * | 8/2008 | Lee | 714/755 |
| 2008/0195922 | A1 * | 8/2008 | Lee | 714/807 |
| 2009/0187806 | A1 * | 7/2009 | Pescatore | 714/757 |

* cited by examiner

*Primary Examiner* — John Trimmings
(74) *Attorney, Agent, or Firm* — Blakely, Sokoloff, Taylor & Zafman LLP

(57) ABSTRACT

Embodiments of the invention are generally directed to systems, methods, and apparatuses for reliability, availability, and serviceability solutions for memory technology. In some embodiments, a host determines the configuration of the memory subsystem during initialization. The host selects a write cyclic redundancy code (CRC) mechanism and a read CRC mechanism based, at least in part, on the configuration of the memory subsystem. Other embodiments are described and claimed.

18 Claims, 8 Drawing Sheets

RELIABILITY, AVAILABILITY, AND SERVICEABILITY SOLUTION FOR MEMORY TECHNOLOGY

This application is a continuation of U.S. patent application Ser. No. 11/942,621, entitled RELIABILITY, AVAILABILITY, AND SERVICEABILITY SOLUTIONS FOR MEMORY TECHNOLOGY filed Nov. 19, 2007 now U.S. Pat. No. 8,132,074 and is hereby incorporated by reference.

TECHNICAL FIELD

Embodiments of the invention generally relate to the field of information technology and, more particularly, to systems, methods and apparatuses for reliability, availability, and serviceability solutions for memory technology.

BACKGROUND

Memory subsystems are susceptible to errors for a number of reasons. If these errors are not handled properly, then they can cause a computing system to malfunction. Redundant information in the form of error correcting codes (ECCs) can be used to mitigate errors such as transient (or soft) errors. As transfer rates increase and voltage swings decrease, the risk of memory errors increases.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to systems, methods, and apparatuses for providing RAS (reliability, availability, and serviceability) solutions within a certain set of volumetric constraints. In some embodiments, a computing system uses different cyclic redundancy code (CRC) schemes for write CRC coverage (or simply write CRC) and read CRC coverage (or simply read CRC). These CRC schemes may be provided while maintaining the same DRAM (dynamic random access memory) form factors that are currently used in the server and client market segments. For example, in some embodiments, CRC coverage is provided for read and/or write data without adding additional pins to the connector. As is further discussed below, this may be achieved by adding user intervals (UIs) to the data frames and/or multiplexing CRC bits over existing pins.

Figure 1:
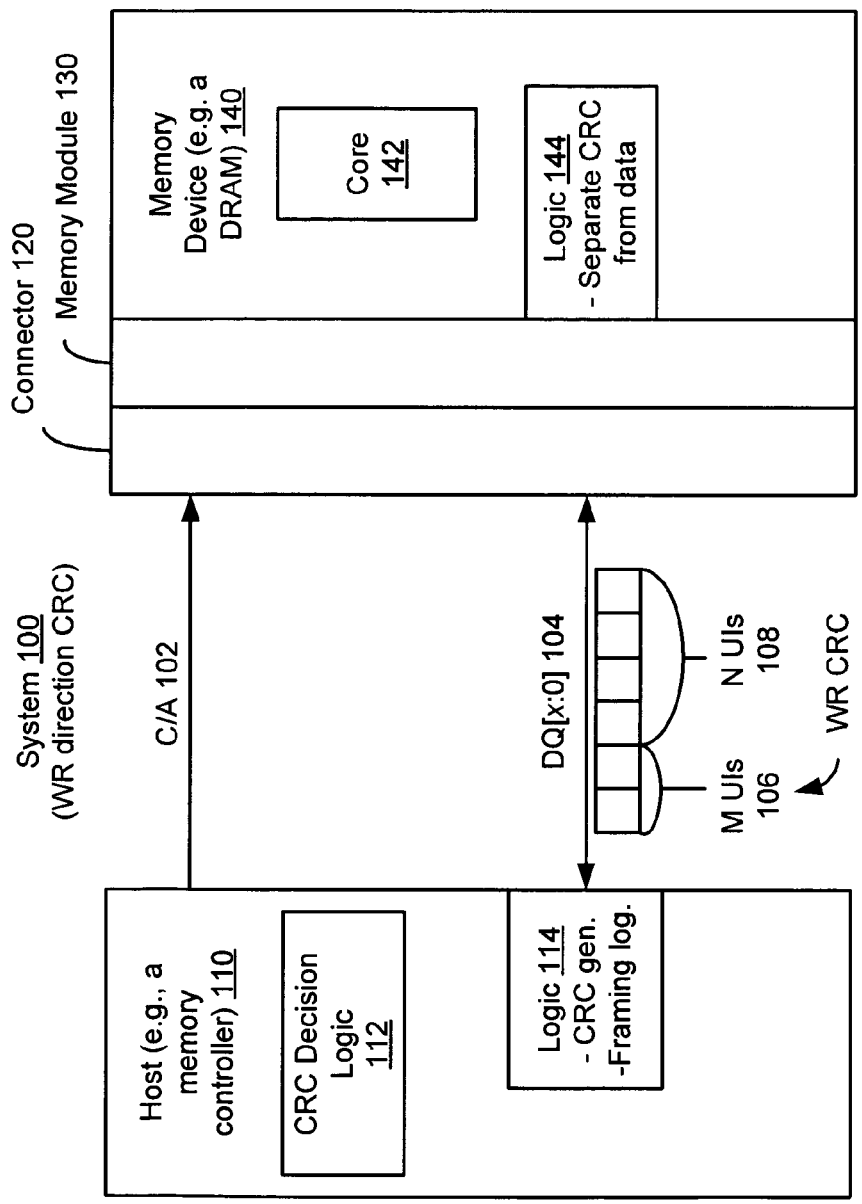
FIG. 1 is a block diagram illustrating selected aspects of a write cyclic redundancy code (CRC) scheme, according to an embodiment of the invention.

FIG. 1 is a block diagram illustrating selected aspects of a write CRC scheme, according to an embodiment of the invention. In the illustrated embodiment, system 100 includes host 110 (e.g., a memory controller), connector 120, memory module 130, and memory device (e.g., a DRAM) 140. For ease of discussion, FIG. 1 only shows a single connector 120, memory module 130, and memory device 140. It is to be appreciated, however, that each module 130 may include a number of memory devices 140 (e.g., 9, 18, . . . , etc.). Similarly, system 100 may include multiple connectors, modules, and the like. In alternative embodiments, system 100 may include more elements, fewer elements, and/or different elements.

Host 110 controls the transfer of data to and from memory device 140. In some embodiments, host 110 is integrated onto the same die as one or more processors. Host 110 includes CRC decision logic 112 and write CRC logic 114. In some embodiments, CRC decision logic 112 determines the write CRC and read CRC schemes for system 100 during, for example, initialization. For example, CRC decision logic 112 may read a non-volatile memory (such as a basic input/output (BIOS) and/or serial presence detect (SPD)) to determine the configuration of system 100. CRC decision logic 112 may then select a write CRC and/or a read CRC based at least in part on the configuration of system 100. If, for example, module 130 is a registered dual-inline memory module (RDIMM), then CRC decision logic 112 may select a write CRC and/or read CRC that is appropriate for an RDIMM configuration. Similarly, if module 130 is an unregistered dual-inline memory module (UDIMM), then CRC decision logic 112 may select a write CRC and/or read CRC that is appropriate for a UDIMM configuration. In some embodiments, the same connector 120 may be used for a number of different system configurations (e.g., RDIMM, UDIMM, and the like). In addition, connector 120 may have the same form factor that was developed for previous generations of memory technology (e.g., connector 120 may be approximately 5.25 inches in length).

In some embodiments, write CRC logic 114 includes CRC generation logic and/or framing logic. The CRC generation logic generates a CRC that memory device 140 can compare with a locally generated checksum to determine whether write data includes an error. The framing logic enables host 110 to operate in a mode in which M UIs of CRC bits (106) are added to N UIs of write data (108) in a write data frame. In some embodiments, M is two and N is eight. In alternative embodiments, M and/or N may have different values.

In some embodiments, write CRC logic 114 may support more than one write CRC scheme. For example, in addition to the scheme described above, write CRC logic 114 may support multiplexing write CRC bits over a preexisting pin (such as a data strobe pin). The term "preexisting pin" refers to a pin that is specified by a previous generation of double data rate (DDR) memory technology that did not support CRC. The term "preexisting pin" also refers to a pin that is used by a system in RDIMM mode and that is not needed in UDIMM mode.

In the illustrated embodiment, CRC decision logic 112 and write CRC logic 114 are each illustrated as a single block of logic. It is to be appreciated, however, that logic 112 and/or logic 114 may be subsumed into other blocks of logic and/or may be divided into a number of other blocks of logic.

Command/Address (C/A) lanes 102 provide a plurality of lanes for sending commands and addresses to memory device 140. DQ lanes 104 provide a bi-directional read/write data bus. Embodiments of the invention may be used with memory devices of nearly any data width including: x4, x8, x16, x32, and the like.

Memory device 140 includes memory core 142 (e.g., a memory array) and write CRC logic 144. Write CRC logic 144 includes logic to enable memory device 140 to support one or more write CRC schemes. In some embodiments, write CRC logic 144 include logic to separate the M UIs of write CRC bits from the N UIs of data bits in a write data frame. Write CRC logic 144 may also include a local CRC generator and comparison logic to compare the received write CRC bits with a locally generated checksum.

In some embodiments, write CRC logic 144 may support more than one write CRC scheme. For example, in addition to the scheme described above, write CRC logic 144 may support de-multiplexing write CRC bits over a preexisting pin (such as a data strobe pin). In other embodiments, write CRC logic 144 may support other write CRC schemes.

Figure 2:
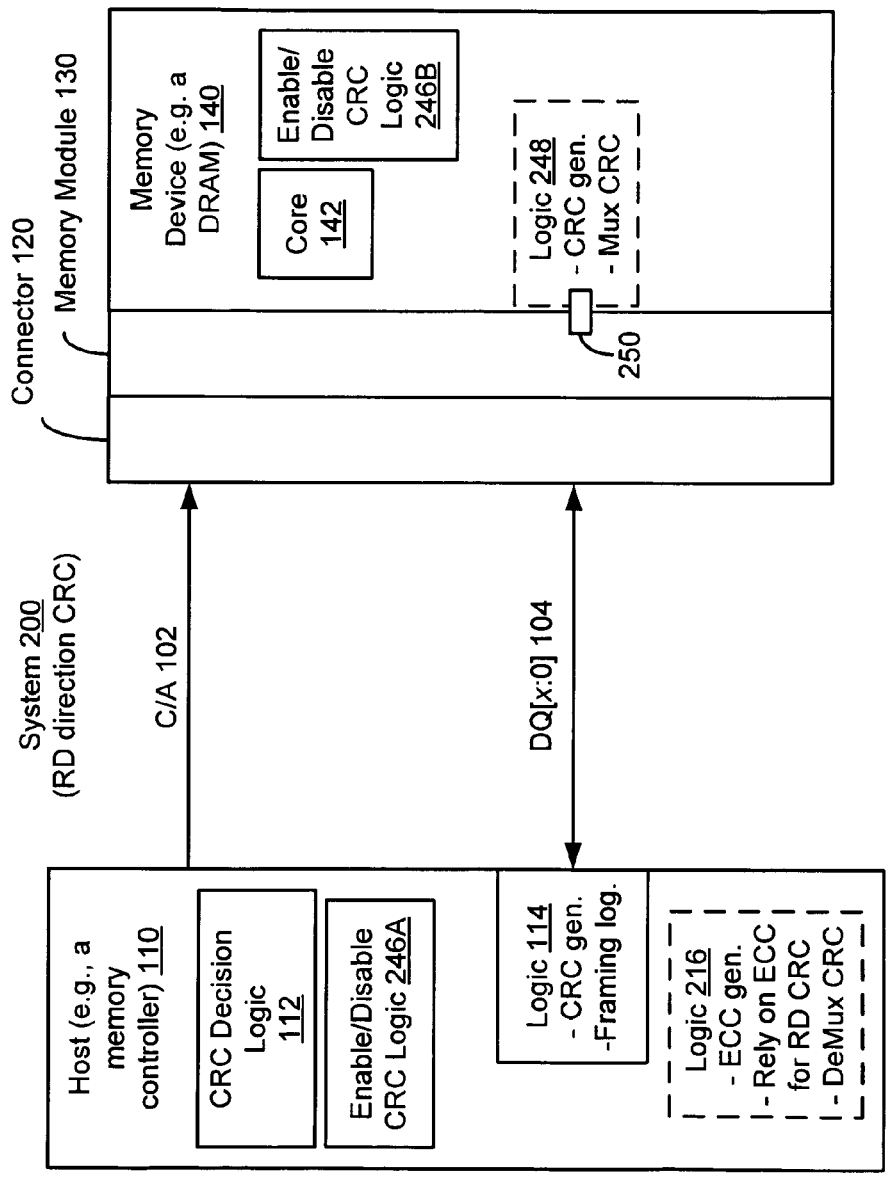
FIG. 2 is a block diagram illustrating selected aspects of a read CRC scheme, according to an embodiment of the invention.

FIG. 2 is a block diagram illustrating selected aspects of a read CRC scheme, according to an embodiment of the invention. System 200 includes host 110 (e.g., a memory controller), connector 120, memory module 130, and memory device (e.g., a DRAM) 140. In alternative embodiments, system 200 may include more elements, fewer elements, and/or different elements.

Host 110 includes read CRC logic 216 to support one or more read CRC schemes. Read CRC logic 216 may include error correction code (ECC) logic to provide ECC coverage for data bits written to memory device 140 (e.g., to protect against soft errors). In some embodiments, host 110 and memory device 140 disable their CRC capabilities (e.g., using enable/disable logic 246) during read operations and rely on the ECC logic to cover read data. If the ECC logic indicates an error, then (in some embodiments) the read operation may be replayed. If an error persists, then the ECC logic may attempt to correct it.

In some embodiments, read CRC logic 216 supports more than one read CRC scheme. For example, in addition to the scheme described above, read CRC logic 216 may support de-multiplexing read CRC bits over a preexisting pin (such as a data strobe pin). In other embodiments, read CRC logic 216 may support other read CRC schemes.

In the illustrated embodiment, memory device 140 includes read CRC logic 248 to support one or more read CRC schemes. Read CRC logic 248 may include a CRC generator to generate a checksum (e.g., CRC bits) to cover read data that is being returned to host 110. In addition, read CRC logic 248 may include logic to multiplex the CRC bits over a preexisting pin (e.g., a data strobe pin such as pin 250). The term "pin" broadly refers to any electrical contact suitable for conducting electrical signals (such as a pad, ball, pin, and the like). In alternative embodiments, read CRC logic 248 may include logic to add M UIs of CRC bits to N UIs of data bits to form a read data frame. In yet other alternative embodiments, read CRC logic 248 may support other read CRC schemes.

Figure 3:
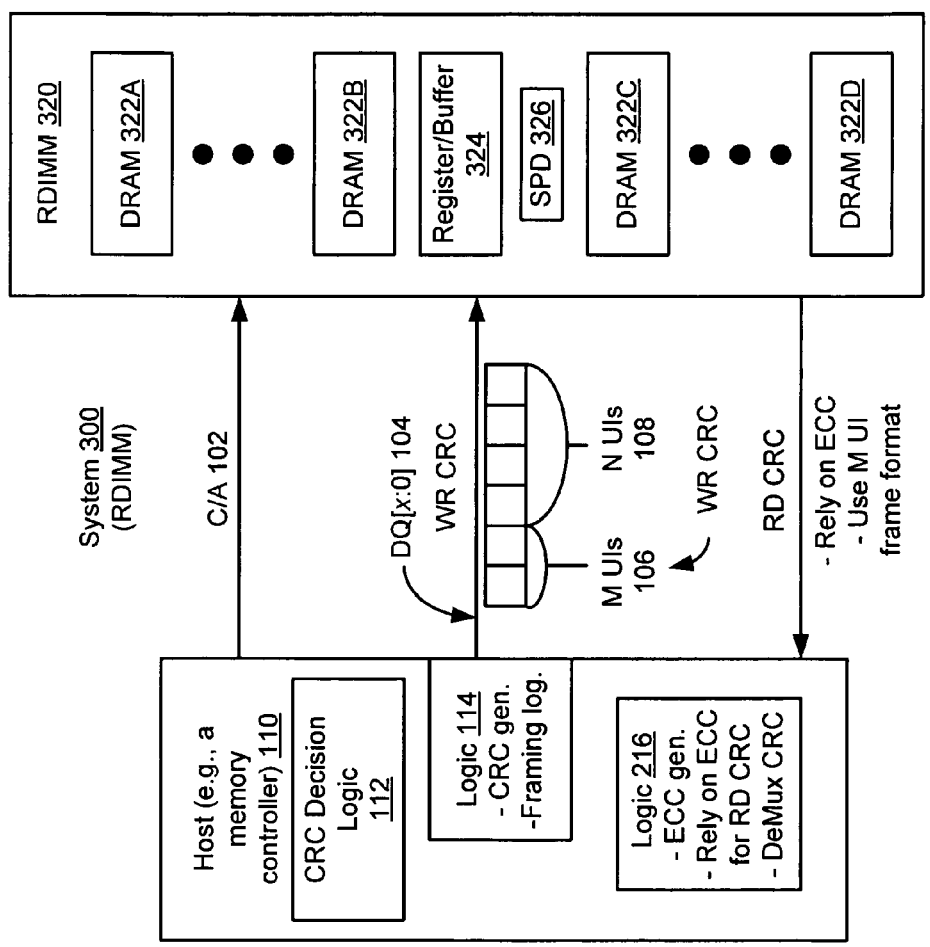
FIG. 3 is a block diagram illustrating selected aspects of a CRC scheme in a memory subsystem including a registered dual-inline memory module (RDIMM), according to an embodiment of the invention.

FIG. 3 is a block diagram illustrating selected aspects of a CRC scheme in a memory subsystem including a registered dual-inline memory module (RDIMM), according to an embodiment of the invention. System 300 includes host 110 (e.g., a memory controller) and RDIMM 320. In alternative embodiments, system 300 may include more elements, fewer elements, and/or different elements. In some embodiments, system 300 is a server.

RDIMM 320 includes a number (e.g., 9, 18, etc.) of DRAMs 322 and register (or buffer) 324. One or more of DRAMs 322 store ECC bits generated by logic 216 on host 110. In some embodiments, RDIMM 320 may include more elements, fewer elements, and/or different elements.

At system initialization, CRC decision logic 112 may access non-volatile memory (e.g., SPD 326) to determine, at least in part, the configuration of system 300. CRC decision logic 112 may select a read CRC scheme and a write CRC scheme after determining the configuration of system 300. In the illustrated embodiment, CRC decision logic 112 determines that host 110 is coupled with RDIMM 320 (and may be configured as a server). Decision logic 112 then selects a write CRC scheme that includes framing M UIs of CRC bits (106) with N UIs of data bits to form a write data frame. DRAMs 322 may include corresponding logic to separate the M UIs of CRC bits and compare them with a locally generated checksum. Decision logic 112 may also select a read CRC scheme. In some embodiments, since host 110 includes support for ECC, decision logic 112 may select a scheme in which the ECC bits are relied upon to provide error coverage in the read direction. In alternative embodiments, decision logic 112 may select a different read CRC scheme and/or a different write CRC scheme. For example, in some embodiments, the read CRC scheme may include adding M UIs of CRC bits to the read data frame.

Figure 4:
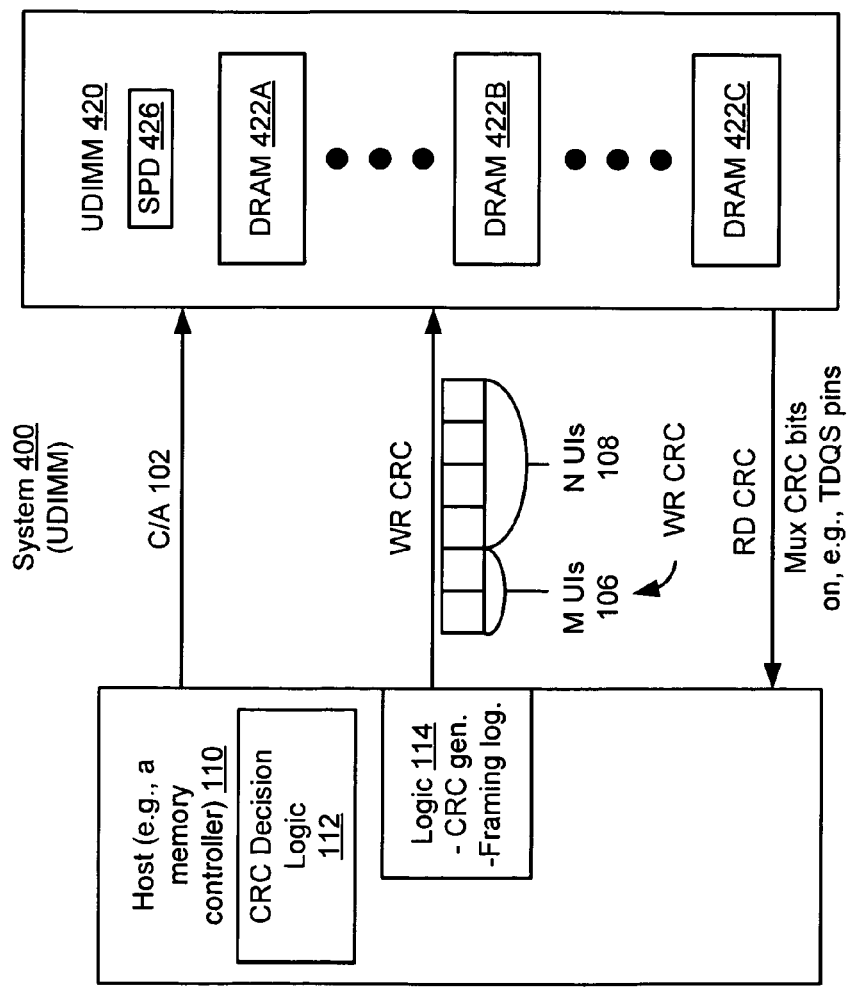
FIG. 4 is a block diagram illustrating selected aspects of a CRC scheme in a memory subsystem including an unregistered dual-inline memory module (UDIMM), according to an embodiment of the invention.

FIG. 4 is a block diagram illustrating selected aspects of a CRC scheme in a memory subsystem including an unregistered dual-inline memory module (UDIMM), according to an embodiment of the invention. System 400 includes host 110 (e.g., a memory controller) and UDIMM 420. In alternative embodiments, system 400 may include more elements, fewer elements, and/or different elements. In some embodiments, system 400 is a client system.

UDIMM 420 includes a number (e.g., 9, 18, etc.) of DRAMs 422 and SPD 426. In alternative embodiments, UDIMM 420 may include more elements, fewer elements, and/or different elements.

At system initialization, CRC decision logic 112 may access non-volatile memory (e.g., SPD 426) to determine, at least in part, the configuration of system 400. CRC decision logic 112 may select a read CRC scheme and a write CRC scheme after determining the configuration of system 400. In the illustrated embodiment, CRC decision logic 112 determines that host 110 is coupled with UDIMM 420 (and may be configured as a client). Decision logic 112 then selects a write CRC scheme that includes framing M UIs of CRC bits (106) with N UIs of data bits (108) to form a write data frame. DRAMs 422 may include corresponding logic to separate the M UIs of CRC bits and compare them with a locally generated checksum. Decision logic 112 may also select a read CRC scheme. In some embodiments, the read CRC scheme includes multiplexing the CRC bits over one or more preexisting pins (e.g., pin 250 shown in FIG. 2). In some embodiments, the preexisting pins are data strobe pins such as the TDQS/TDQS# pins. In alternative embodiments, the CRC bits may be multiplexed over a different pin or pins. DRAMs 422 may include logic to multiplex the CRC bits on the pin(s) and host 110 may include logic to de-multiplex the CRC bits from the pin(s).

In yet other alternative embodiments, decision logic 112 may select a different read CRC scheme and/or a different write CRC scheme. For example, in some embodiments, the read CRC scheme may include adding M UIs of CRC bits to the read data frame. Alternatively, system 400 may support ECC coverage and the read CRC scheme may rely on the ECC coverage.

Figure 5:
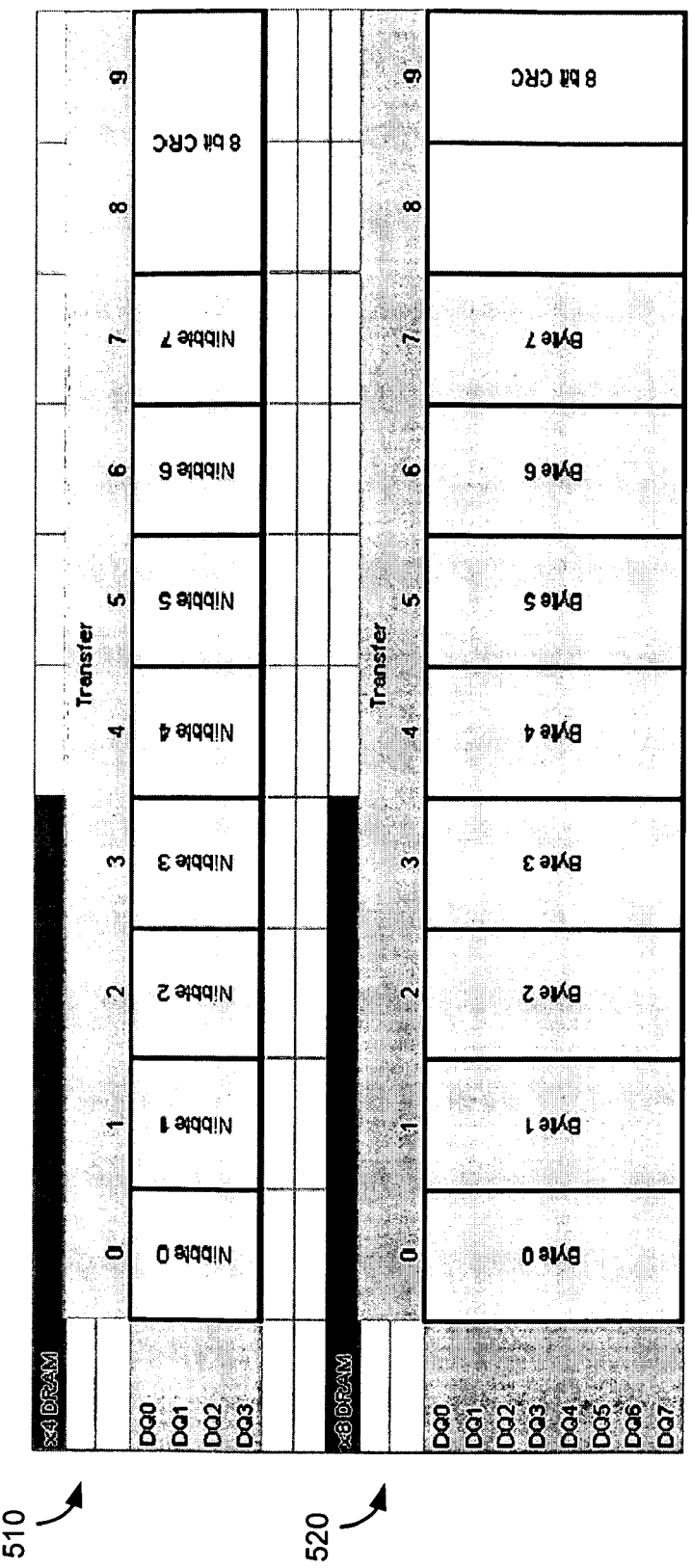
FIG. 5 is a block diagram illustrating selected aspects of frame formats for x4 and x8 dynamic random access memory devices (DRAMs), according to an embodiment of the invention.

FIG. 5 is a block diagram illustrating selected aspects of frame formats for x4 and x8 dynamic random access memory devices (DRAMs), according to an embodiment of the invention. Frame 510 illustrates the frame format for an embodiment of the invention in which two UIs of CRC bits are combined with eight UIs of data bits for a x4 device. Similarly, frame 520 illustrates the frame format for an embodiment of the invention in which two UIs of CRC bits are combined with eight UIs of data bits for a x8 device. In alternative embodiments, a different number of UIs may be used for the CRC bits and/or the data bits.

Figure 6:
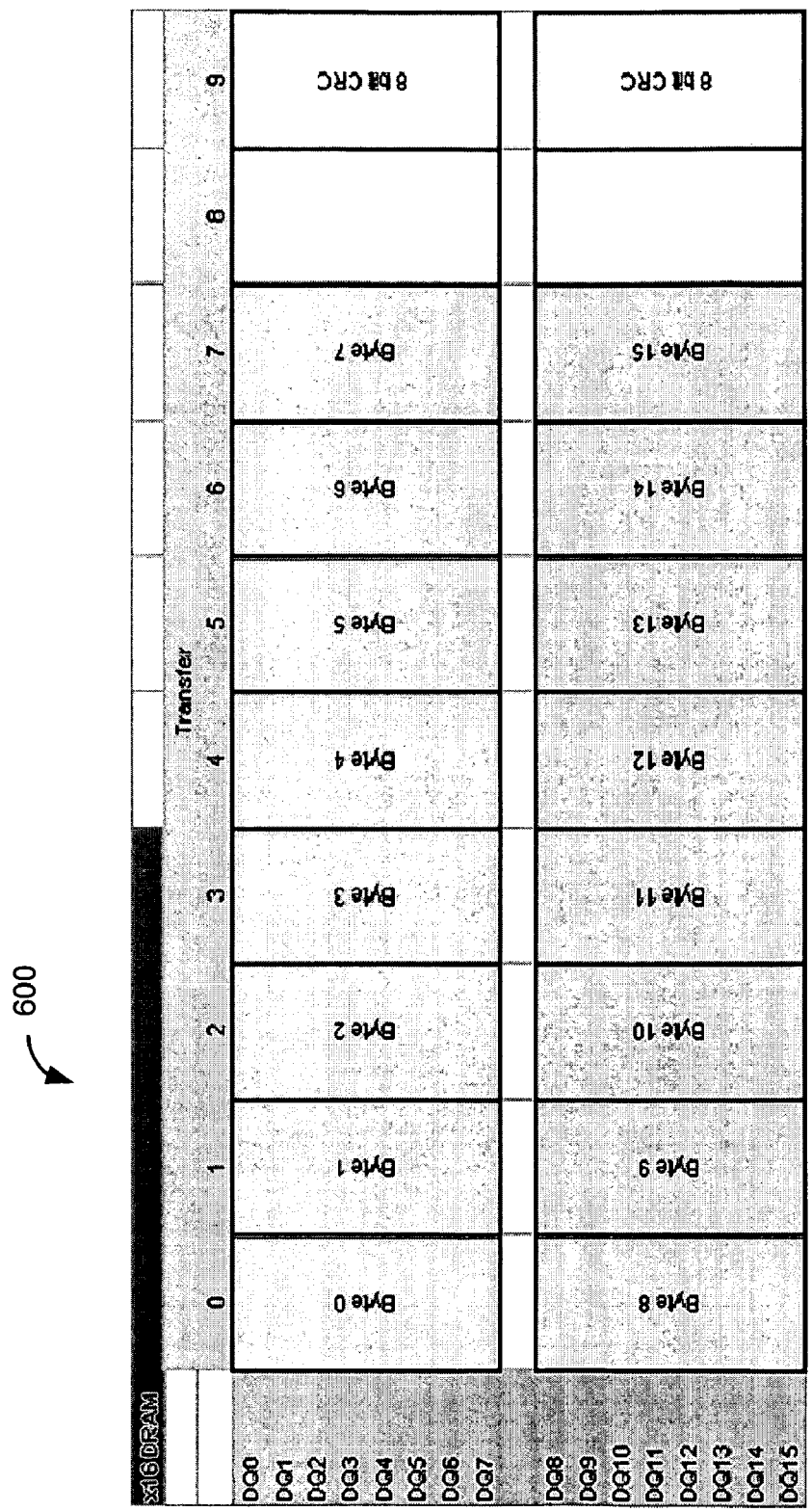
FIG. 6 is a block diagram illustrating selected aspects of a frame format for a x16 DRAM, according to an embodiment of the invention.

FIG. 6 is a block diagram illustrating selected aspects of a frame format in a x16 DRAM, according to an embodiment of the invention. Frame 600 illustrates the frame format for an embodiment of the invention in which two UIs of CRC bits are combined with eight UIs of data bits for a x16 device. As illustrated in FIG. 6, the x16 device frame format is essentially two instances of the x8 frame format (e.g., frame 520 shown in FIG. 5).

Figure 7:
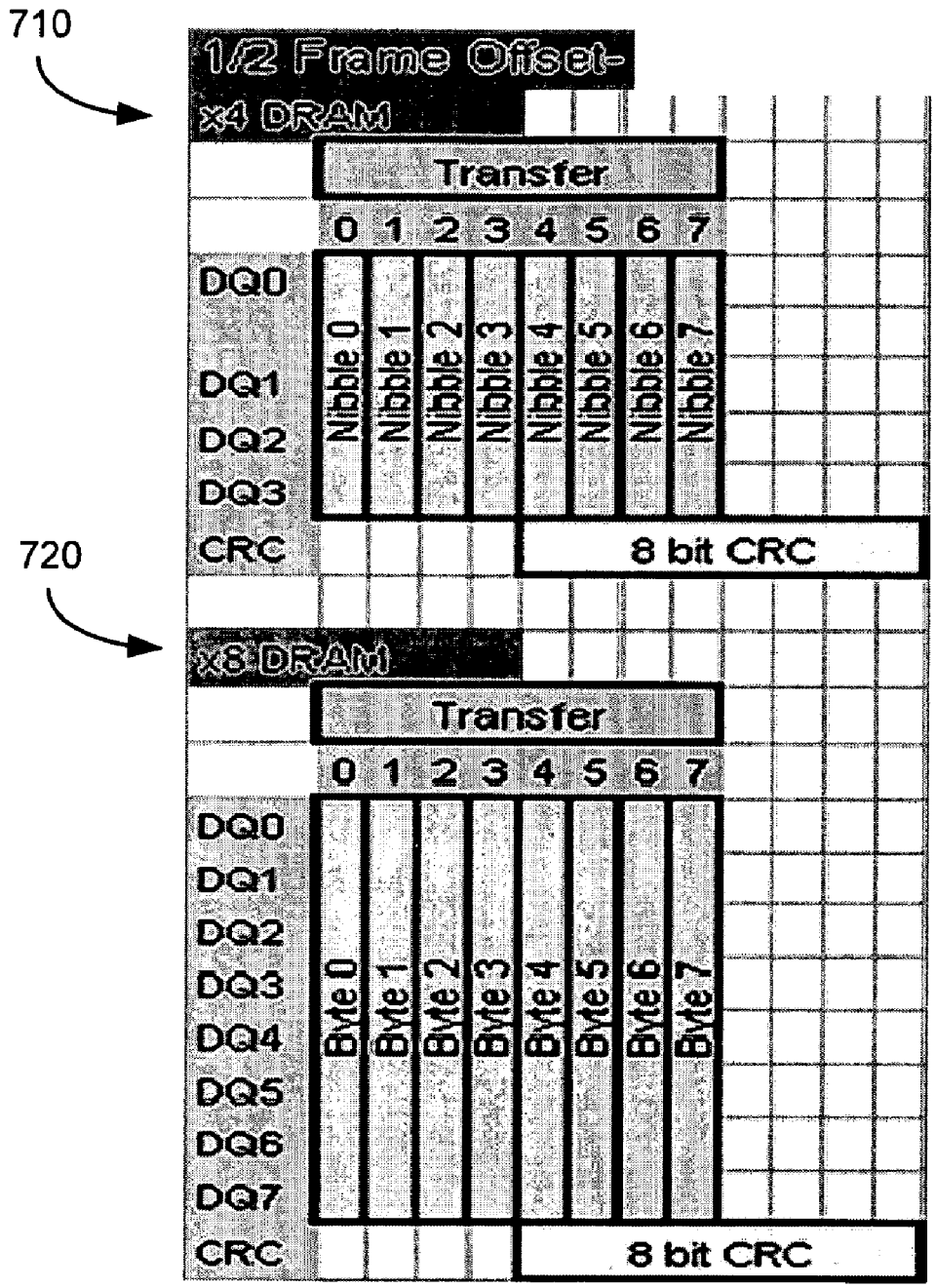
FIG. 7 is a block diagram illustrating selected aspects of offsetting the CRC bits from the data bits, according to an embodiment of the invention.

FIG. 7 is a block diagram illustrating selected aspects of offsetting the CRC bits from the data bits, according to an embodiment of the invention. In some embodiments, the CRC bits are offset from the data bits to improve latency. For example, transmission of the data bits may begin before the corresponding CRC bits are generated. In some embodiments, the offset between the data bits is ½ of a frame as shown by 710 (for a x4 device) and 720 (for a x8 device). In alternative embodiments, the offset may be different (or may not be used at all). Other frame formats (for arranging data bits and CRC bits) that are suitable for use with separate CRC pins may be used in other embodiments of the invention.

Figure 8:
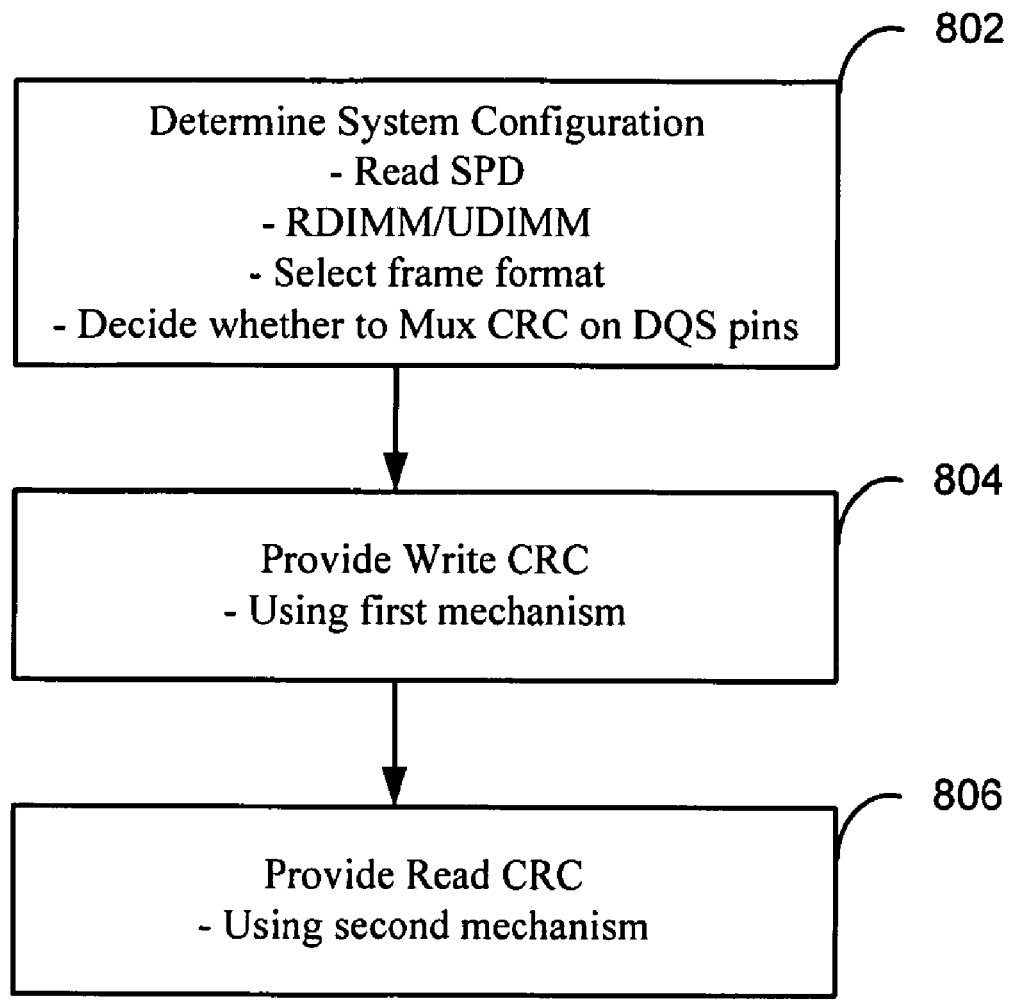
FIG. 8 is a flow diagram illustrating selected aspects of a method for providing CRC in different market segments without substantially changing the form factors of the components in the memory subsystems.

FIG. 8 is a flow diagram illustrating selected aspects of a method for providing CRC in different market segments without substantially changing the form factors of the components in the memory subsystems. Referring to process block 802, CRC decision logic (e.g., 112, in FIG. 1) determines the configuration of a system. This process may include accessing information about the elements in the system and the manner in which the elements are interconnected. In some embodiments, the decision logic determines whether a host is connected to an RDIMM or a UDIMM.

The decision logic selects a read CRC scheme and a write CRC scheme based, at least in part, on the configuration of the system. Selecting the CRC schemes may include selecting a frame format for the write direction and/or the read direction. It may also (or alternatively) include deciding whether to multiplex/de-multiplex the CRC bits on one or more preexisting pins (e.g., data strobe pins).

Referring to process block 804, the host provides a write CRC scheme. In some embodiments, the write CRC scheme includes adding M UIs of CRC bits to N UIs of data bits to create a write data frame. In alternative embodiments, the write CRC scheme includes multiplexing/de-multiplexing the CRC bits on a preexisting pin(s).

Referring to process block 806, the host provides a read CRC scheme. In some embodiments, the read CRC scheme includes relying on ECC logic to provide coverage of the read data bits. In alternative embodiments, it includes adding M UIs of CRC bits to N UIs of data bits to create a read data frame. In yet other alternative embodiments, the read CRC scheme may include multiplexing/de-multiplexing the CRC bits on a preexisting pin(s).

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the description above, certain terminology is used to describe embodiments of the invention. For example, the term "logic" is representative of hardware, firmware, software (or any combination thereof) to perform one or more functions. For instance, examples of "hardware" include, but are not limited to, an integrated circuit, a finite state machine, or even combinatorial logic. The integrated circuit may take the form of a processor such as a microprocessor, an application specific integrated circuit, a digital signal processor, a microcontroller, or the like.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

What is claimed is:

1. An integrated circuit comprising:
first logic to provide write cyclic redundancy code (CRC) coverage for data bits of a frame by appending M user intervals of CRC bits to N user intervals of the data bits, wherein the first logic supports multiplexing write CRC bits over a pin that is specified by a previous generation of double data rate (DDR) memory technology that did not support CRC; and second logic to provide read error detection logic to determine whether a read frame includes an error bit;

wherein the integrated circuit includes a memory controller with a form factor that is substantially the same as a memory controller that does not support CRC and CRC bits are multiplexed over a data strobe line.

2. The integrated circuit of claim 1, wherein M is two and N is eight.

3. The integrated circuit of claim 1, wherein the second logic is error correction code logic.

4. The integrated circuit of claim 1, further comprising:
third logic to select a CRC scheme, wherein the CRC scheme includes a write CRC scheme and a read CRC scheme.

5. The integrated circuit of claim 4, wherein the write CRC scheme is different than the read CRC scheme.

6. A system comprising:
a host including
first logic to provide write cyclic redundancy code (CRC) coverage for data bits of a write frame by combining M user intervals of CRC bits to N user intervals of the data bits, wherein the first logic supports multiplexing write CRC bits over a pin that is specified by a previous generation of double data rate (DDR) memory technology that did not support CRC, and
second logic to provide read error detection logic to determine whether a read frame includes an error bit, wherein the first logic and the second logic are housed within an integrated circuit package that includes a memory controller with a form factor that is substantially the same as a memory controller that does not support CRC and CRC bits are multiplexed over a data strobe line;
a memory module coupled with the host via a memory channel; and
a memory device coupled with the memory module, the memory device including, a memory array.

7. The system of claim 6, wherein the memory device further includes:
cyclic redundancy generation (CRC) logic to provide CRC coverage for data bits read from the memory array; and
multiplexing logic to multiplex CRC bits provided by the CRC logic over a DQS pin of the dynamic random access memory device.

8. The system of claim 7, wherein the second logic to provide read error detection logic to determine whether a read frame includes an error bit includes de-multiplexing logic to de-multiplex the CRC bits from a DQS pin of the host.

9. The system of claim 8, wherein the memory module is an unregistered dual in-line memory module (UDIMM).

10. The system of claim 8, wherein the memory module is a registered dual in-line memory module (RDIMM).

11. The system of claim 7, wherein the memory device further includes:
disable logic to disable the CRC logic.

12. The system of claim 11, wherein the second logic is error correction code logic.

13. The system of claim 6, wherein the host further includes:
third logic to select a CRC scheme, wherein the CRC scheme includes a write CRC scheme and a read CRC scheme.

14. A method comprising:
determining a configuration of a memory subsystem of a computing system;
selecting a write cyclic redundancy code (CRC) mechanism based, at least in part, on the configuration of the memory subsystem; and
selecting a read CRC mechanism based, at least in part, on the configuration of the memory system, wherein the write CRC mechanism is different than the read CRC mechanism, wherein the first logic supports multiplexing write CRC bits over a pin that is specified by a previous generation of double data rate (DDR) memory technology that did not support CRC.

15. The method of claim 14, wherein selecting the write CRC mechanism comprises:
selecting a write frame format, the write frame format including M user intervals of CRC bits to N user intervals of the data bits.

16. The method of claim 15, wherein M is two and N is eight.

17. The method of claim 14, wherein selecting a read CRC mechanism based, at least in part, on the configuration of the memory subsystem comprises:
selecting a read CRC mechanism that includes multiplexing read CRC bits on one or more DQS pins, if the memory subsystem includes an unregistered dual in-line memory module (UDIMM).

18. The method of claim 14, wherein selecting a read CRC mechanism based, at least in part, on the configuration of the memory subsystem comprises:
selecting a read CRC mechanism that relies on an error correction code for read CRC coverage, if the memory subsystem includes a registered dual in-line memory module (RDIMM).

* * * * *